United States Patent [19]

Hakogi

[11] Patent Number: 5,679,291
[45] Date of Patent: Oct. 21, 1997

[54] METHOD OF FABRICATING OPTICAL WAVEGUIDE DEVICE

[75] Inventor: Hironao Hakogi, Kawasaki, Japan

[73] Assignee: Fujitsu Limited, Kanagawa, Japan

[21] Appl. No.: 510,090

[22] Filed: Aug. 1, 1995

[30] Foreign Application Priority Data

Jan. 13, 1995 [JP] Japan .................. 7-004513

[51] Int. Cl.⁶ .................. B29D 11/00; G02B 1/00; G02B 6/18; B29C 71/00
[52] U.S. Cl. .................. 264/1.24; 264/40.1; 264/235
[58] Field of Search .................. 264/1.21, 1.24, 264/40.1, 235

[56] References Cited

U.S. PATENT DOCUMENTS

| | | | |
|---|---|---|---|
| 5,074,631 | 12/1991 | Hamano et al. | 385/3 |
| 5,404,412 | 4/1995 | Seino et al. | 385/2 |
| 5,473,711 | 12/1995 | Hakogi et al. | 385/14 |
| 5,526,448 | 6/1996 | Naga et al. | 385/1 |

FOREIGN PATENT DOCUMENTS

| | | |
|---|---|---|
| 1232811 | 9/1989 | Japan . |
| 5158005 | 6/1993 | Japan . |

*Primary Examiner*—Donald E. Czaja
*Assistant Examiner*—Jacqueline A. Ruller
*Attorney, Agent, or Firm*—Helfgott & Karas, P.C.

[57] ABSTRACT

The method of fabricating an optical waveguide device of the present invention is applicable to an optical waveguide device having at least two asymmetric electrodes for applying an electric field to an optical waveguide formed on a substrate of a ferroelectric crystal. The method is characterized by that annealing at a high temperature is carried out for the substrate and the electrodes after the electrodes have been formed on the substrate. The annealing temperature is 100° C. or over, for example. By carrying out such annealing, the operating characteristic of the optical waveguide device, the operating point of a Mach-Zehnder type optical modulator, for example, can be stabilized.

8 Claims, 5 Drawing Sheets

METHOD OF FABRICATING OPTICAL WAVEGUIDE DEVICE

BACKGROUND OF THE INVENTION

1. Field of the Invention

The present invention relates to a method of fabricating an optical waveguide device having at least two asymmetric electrodes applying an electric field to an optical waveguide formed on a substrate of a ferro-electric crystal.

2. Description of the Related Art

Optical waveguide elements fabricated by forming an optical waveguide on a substrate of a ferro-electric crystal of lithium niobate ($LiNbO_3$), lithium tantalate ($LiTaO_3$), or the like by thermal diffusion of metal such as Ti or an oxide of the metal into the surface have low loss and wideband characteristics and, further, have a feature that they can be mass-fabricated by using planar techniques. Therefore, there have been made wide researches on and developments of the optical waveguide elements and some of them have been brought up to the practical level. Especially, those optical wave-guide devices, such as optical modulators, fabricated by disposing electrodes correspondently to optical waveguides on a ferroelectric crystal substrate and adapted to perform such operation as modulation by having the refractive index of the optical waveguide adjusted by application of controlled voltage to the electrode, are being paid keen attention because of their high speed characteristic. As optical waveguide devices of the described type, those of Y branch type, cross (X) type, directional coupler type, Mach-Zehnder type (branch and interference type), and balanced bridge type are known.

The Y branch type optical switch is a 1×2 switch adapted to perform switching operation by having the refractive index at the branch portion of the optical waveguide controlled by an applied voltage so that the branching ratio is changed. A 1×N matrix switch can be obtained by arranging the same in cascade connection.

The cross (X) type optical switch is a 2×2 switch adapted to perform switching operation by diffraction, total reflection, or mode interference obtained by having the refractive index at the crossing portion of the optical waveguides controlled by an applied voltage. An N×N matrix switch can be obtained by arranging the same in cascade connection.

The directional coupler type optical switch is a 2×2 switch controlling the phase difference between two optical waveguides, which governs the optical power transfer occurring when two parallel optical waveguides are brought close to each other, through a change in the refractive index caused by an applied voltage. An N×N matrix switch can also be obtained by arranging the same in cascade connection.

The Mach-Zehnder type optical modulator has two optical waveguides with both ends joined together, in which refractive indexes are made to differ from each other by application of a voltage thereto, so that a phase difference is produced between two lightwaves after branching out and an interference between the lightwaves occurs when they are coupled together and, thereby, modulating operation is performed.

The balanced bridge type optical switch is that constitutes a 2×2 optical switch by having the directional coupler type and the Mach-Zehnder type combined, and its operating principle is virtually the same as that of the Mach-Zehnder type.

Now, taking the Mach-Zehnder type optical modulator as an example, its structure and operation will be described briefly. A Mach-Zehnder type optical modulator is constructed by forming a pair of optical waveguides, joined together around both their ends, on the surface of a substrate of, for example, Z-cut lithium niobate, by applying thermal diffusion of titanium to the surface to increase refractive index in the diffused regions, forming a buffer layer of $SiO_2$ on the same, and forming a pair of metallic electrodes on the same correspondently to the pair of optical waveguides. One of the pair of electrodes is a signal electrode and the other is a grounding electrode.

Introduced light into the device is split and led to the pair of optical waveguides. When a drive voltage is applied between the signal electrode and the grounding electrode, a phase difference is produced between the split lightwaves by the electro-optic effect. Both the lightwaves are coupled again and taken out as an optical signal output. By controlling the drive voltage to bring the phase difference between both the split lightwaves to zero or $\pi$, an on-off digital signal, for example, can be obtained.

With the described Mach-Zehnder type optical modulator, there is a problem that it is lacking in operational stability because its operating point changes with application of DC voltage (DC drift) or the operating point changes with a change in temperature (temperature drift). The latter, temperature drift, is caused by development, in the ferroelectric crystal, of not only the electro-optic effect but also the pyroelectric effect (presenting a phenomenon of electric charges being produced on the surface of a crystal when temperature is changed) and the photoelastic effect (presenting a phenomenon of the refractive index being changed by application of mechanical stress).

It is known that the temperature characteristic affected by the pyroelectric effect can be improved greatly by providing a buffer layer (of $SiO_2$, for example) and a conductive film (of Si, for example) interposed between the ferroelectric crystal and the electrodes. Influence of the photoelastic effect involves a problem that the operating point gradually changes because the stress of the electrodes exerting on the ferro-electric crystal changes with the passage of time. While the problem with the Mach-Zehnder type optical modulator has been described above, this problem is that which is common to optical waveguide devices formed with a ferro-electric crystal.

SUMMARY OF THE INVENTION

An object of the present invention is to provide a method of fabricating an optical waveguide device having good operational stability.

According to the invention, a method of fabricating an optical waveguide device having at least two asymmetric electrodes for applying an electric field to an optical waveguide formed on a substrate of a ferro-electric crystal is provided, which method comprises a first step forming the electrodes on the substrate and a second step performing annealing at a high temperature for the substrate and the electrodes to thereby stabilize the operating characteristic of the optical waveguide device.

Since a ferroelectric crystal of lithium niobate or the like has a high dielectric constant, it, in fabricating an optical waveguide device by forming electrodes on a ferroelectric crystal substrate, is effective to make the electrodes thicker in order to secure high-speed operating characteristic of the device. As a method of forming electrodes to meet the above requirement, there is gold plating in practice. Since gold plating is generally performed at temperatures around 80° C., internal stress is generated in the electrodes formed by the plating. The stress causes strain in the optical waveguide under the electrode and, thereby, the refractive index of the optical waveguide is changed. The change in refractive index in a Mach-Zehnder optical modulator, for example, causes its operating point voltage to shift from the point it has when it is free from stress. Further, in course of relaxation of the internal stress of the electrode, the operating point will change with time.

If the electrodes for applying an electric field to the optical waveguide have symmetric forms, the movement of the operating point do not become great because strains are evenly produced in the optical waveguides. However, when the electrodes applying an electric field to the optical waveguide have asymmetric forms, the temperature drift becomes very harmful to the practical use of the device.

Electrodes having asymmetric forms are used in traveling-wave type optical waveguide devices represented by Mach-Zehnder optical modulators for high-speed modulation. In a traveling-wave type Mach-Zehnder optical modulator, the signal electrode is shaped in a long and narrow form and arranged along the optical waveguide to make the electric signal transmitted through the signal electrode may travel in the same direction as that in which the light propagated through the optical waveguide travels. On the other hand, the grounding electrode is designed to have a large area to support wideband applications. Because of such asymmetry between the signal electrode and the grounding electrode, effect of the temperature drift is unavoidable.

By experiments, it has been made known that the internal stress generated in the electrode can be relaxed by application of high-temperature annealing and the time required for the relaxation can be made shorter, the higher the annealing temperature is. In the method of fabricating an optical waveguide according to the present invention, annealing at a high temperature is performed for the substrate and the electrodes after the electrodes have been formed on the substrate of a ferroelectric crystal. Hence, it is made possible to stabilize the operating characteristic (for example, the operating point of the Mach-Zehnder optical modulator) by suppressing occurrence of the change in the characteristic with time.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

An embodiment of the invention will be described in detail with reference to the accompanying drawings.

Figure 1:
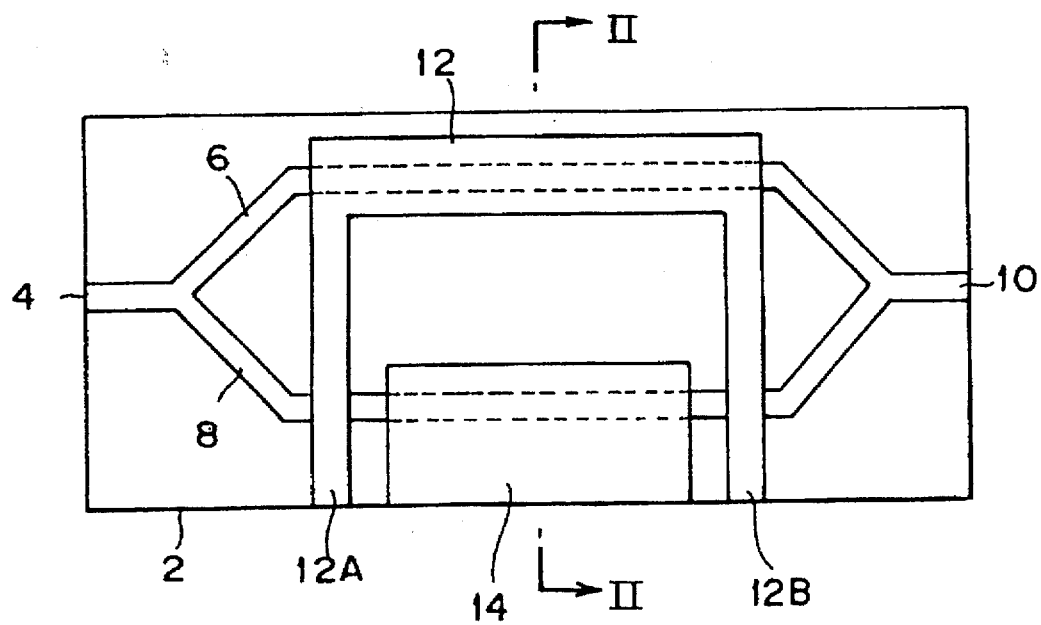
FIG. 1 is a plan view showing an example of Mach-Zehnder type optical modulator to which the invention is applicable.
Figure 2:
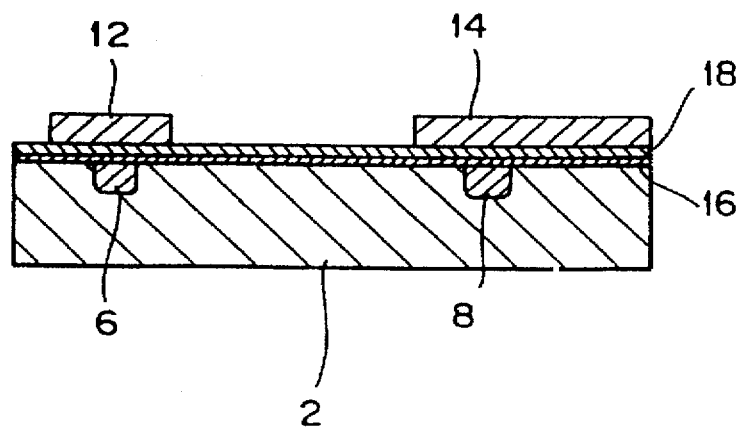
FIG. 2 is a sectional view taken along line II—II of FIG. 1.

FIG. 1 is a plan view showing an example of a Mach-Zehnder type optical modulator to which the invention is applicable and FIG. 2 is a sectional view taken along line II—II of FIG. 1. The optical modulator is fabricated by forming an optical waveguide on a substrate of Z-cut $LiNbO_3$ (lithium niobate) by application of thermal diffusion of Ti (titanium) to the surface and forming thereon electrodes for applying an electric field to the optical waveguide.

The optical waveguide formed on the substrate 2 has an input port 4 to which light from a light source (not shown) is supplied, a pair of branch waveguides 6 and 8 for splitting the light input from the input port 4 into two light beams and allowing the beams to propagate therethrough, and an output port 10 for joining the transmitted light beams together and outputting the joined beams. One branch waveguide 6 is provided with a signal electrode 12 formed thereon and the other branch waveguide 8 is provided with a grounding electrode 14 formed thereon. Between the substrate 2 and the electrodes 12 and 14, there are sandwiched a buffer layer 16 of an insulating material such as $SiO_2$ and a conductive layer 18 of Si or the like having resistivity at a level sufficiently higher than the resistivity of each electrode but allowing electric charges to move therethrough, the layers being deposited on the substrate 2 in order of mention. The conductive layer 18 is provided for suppressing changes in the temperature characteristic of the device due to the pyroelectric effect. To keep clarity of the drawing, the buffer layer 16 and the conductive layer 18 are not shown in FIG. 1.

A driving signal is applied between the signal electrode 12 and the grounding electrode 14. The signal electrode 12 is configured to form a traveling-wave type such that the electric field produced by the driving signal travels in the same direction as that in which the light propagating through the branch waveguide 6 travels. More specifically, the signal electrode 12 is shaped into a long and narrow form arranged along the branch wave-guide 6. On the other hand, the grounding electrode 14 is formed to have a sufficiently large area to support wideband applications. As described above, an operating-point drift is produced due to the asymmetry between the signal electrode 12 and the grounding electrode 14.

The driving signal is applied to the signal electrode 12 at its end 12A on the side upstream the above described propagation. Between the end 12B of the signal electrode 12 on the side downstream the propagation and the grounding electrode 14, there is connected a terminating resistor of, for example, 50Ω. By the configuration of the signal electrode 12 forming a traveling-wave type, the device is enabled to perform faster modulation than that of another type.

Figure 3:
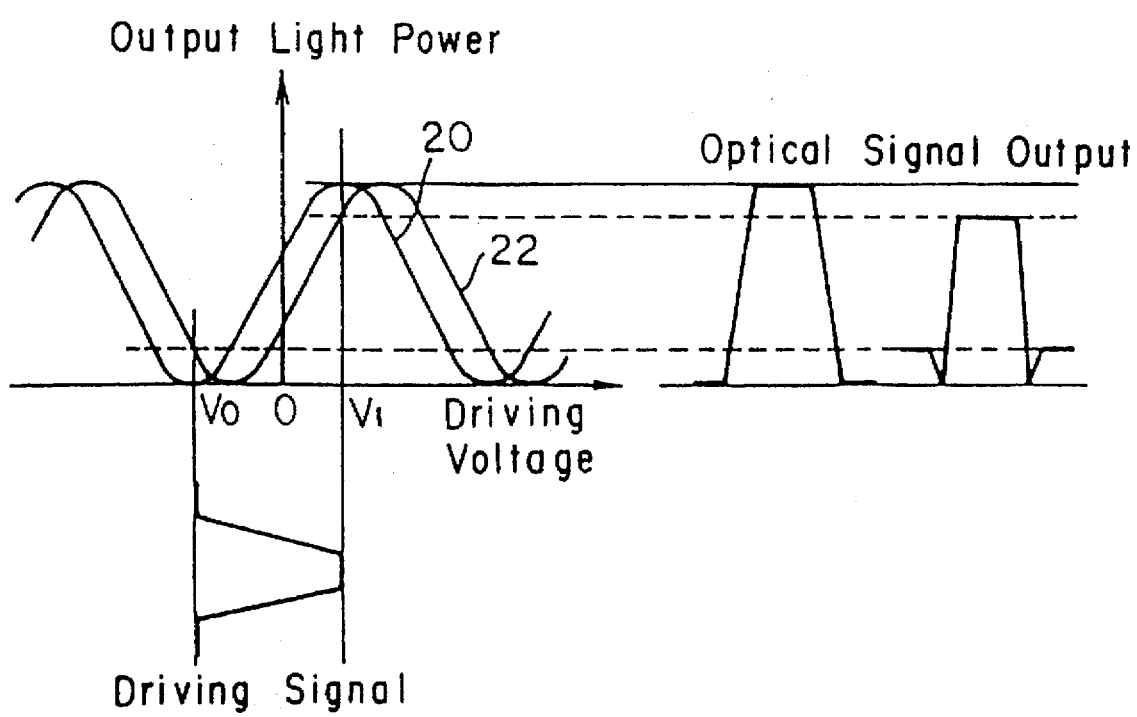
FIG. 3 is a diagram showing operating characteristics of a Mach-Zehnder optical modulator.

FIG. 3 is a diagram showing input and output characteristics of the optical modulator shown in FIG. 1 and FIG. 2. Referring to FIG. 3, reference numeral 20 denotes the characteristic before occurrence of an operating-point drift and 22 denotes the characteristic after occurrence of an operating-point drift. The "operating-point drift" here means a drift of the operating characteristic curve, which indicates the relationship between the output light power and the drive voltage, shifting in the increasing or decreasing direction of the voltage.

The operating characteristic of a Mach-Zehnder type optical modulator has periodicity with reference to change of the voltage as shown in FIG. 3. Therefore, by using driving voltages $V_0$ and $V_1$ which provide a minimum value and a maximum value of the output light power corresponding to logical values of the driving signal ("0" and "1"), effective two-valued modulation can be realized.

If an operating-point drift occurs while the driving voltages $V_0$ and $V_1$ are held constant, waveform distortions and extinction-ratio deteriorations are produced in the output optical signal because of the above described periodicity. Therefore, when an operating-point drift occurs, it is desirable that the operating-point drift is compensated for by changing the driving voltages $V_0$ and $V_1$ to voltages $V_0+dV$ and $V_1+dV$, respectively, where dV represents the operating-point drift.

As an automatic bias control circuit for compensating the operating-point drift, there is known, for example, a circuit in which a low-frequency signal is superposed on either or both of the logical levels of the driving signal for driving the optical modulator and the operating point is controlled by the phase of the low-frequency signal detected from the optical signal output of the optical modulator. Even when such automatic bias control circuit is used, it is desired, in view of the fact that the temperature drift amounts to 1–2 volts while the amplitude of the driving signal is about 5 V, that the drift is kept as small as possible to facilitate the initial setting of the operating point.

To suppress the operating-point drift, especially, the temperature drift, to as low a level as possible, the following processing steps are taken.

Figure 4:
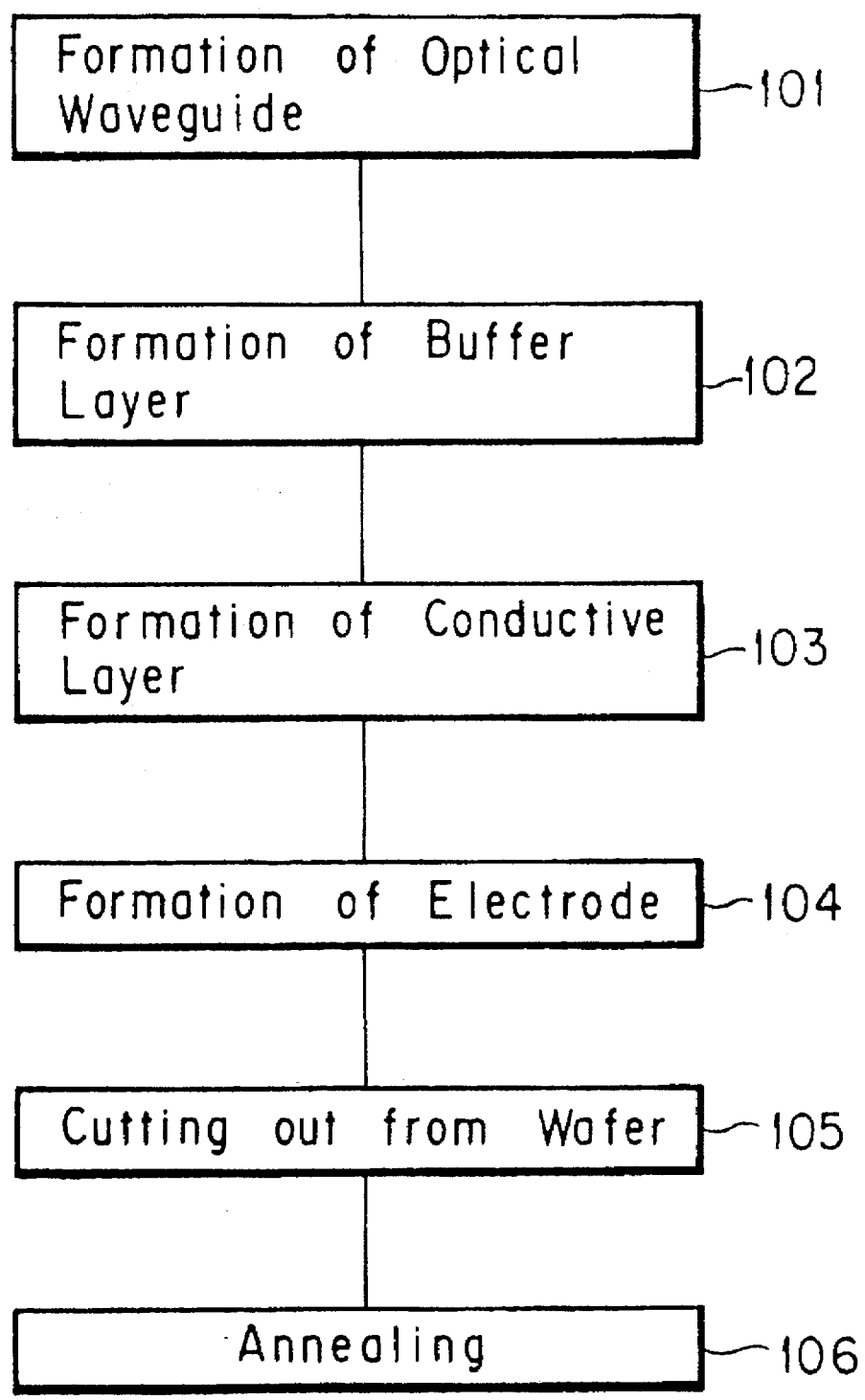
FIG. 4 is a flowchart showing fabrication steps of an embodiment of the invention.
Figure 5:
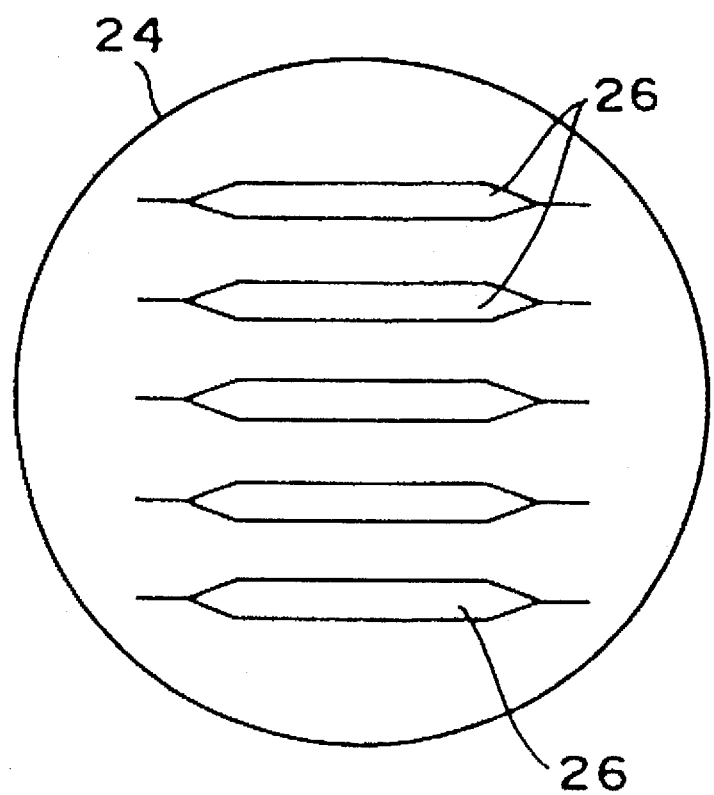
FIG. 5 is a plan view of a wafer in the embodiment of the invention.

FIG. 4 is a flowchart showing fabrication processes of the Mach-Zehnder type optical modulator according to the embodiment of the invention. First, in step 101, a plurality of optical waveguides 26 are formed on a wafer 24 of Z-cut $LiNbO_3$ (refer to FIG. 5), which becomes the base material of the substrate 2 shown in FIG. 2, by thermally diffusing Ti into the wafer. Each optical modulator includes the optical waveguides 6 and 8 shown in FIG. 2. In the formation of the optical waveguides 26, ordinary planar techniques using resist and masking can be employed.

In step 102 that follows, a buffer layer corresponding to the buffer layer 16 shown in FIG. 2 is formed on the wafer 24. In step 103, a conductive layer corresponding to the conductive layer 18 shown in FIG. 2 is formed on the buffer layer.

Then, in step 104, the signal electrodes 12 and the grounding electrodes 14 shown in FIG. 2 are formed for their respective optical waveguides 26. Thereafter, in step 105, each optical modulator is cut out from the wafer 24 and, thus, optical modulators of the number corresponding to the number of the optical waveguides 26 can be obtained. Finally, in step 106, annealing at a high temperature is applied to each optical modulator.

The reason why annealing is applied to the optical modulator after it has been cut out from the wafer is that, while there is a possibility, if annealing is applied to the work while it is as yet on the wafer, of discharging occurring between the front and back sides of the wafer caused by a great potential difference developed between the front and back sides by pyroelectric effect due to heating, resulting in breakage of the optical waveguides and others located at the edge portion of the wafer, occurrence of such discharging is made less possible by applying the annealing to the optical modulator after it has been cut out because its surface area is sufficiently smaller than the total surface area of the wafer.

Figure 6:
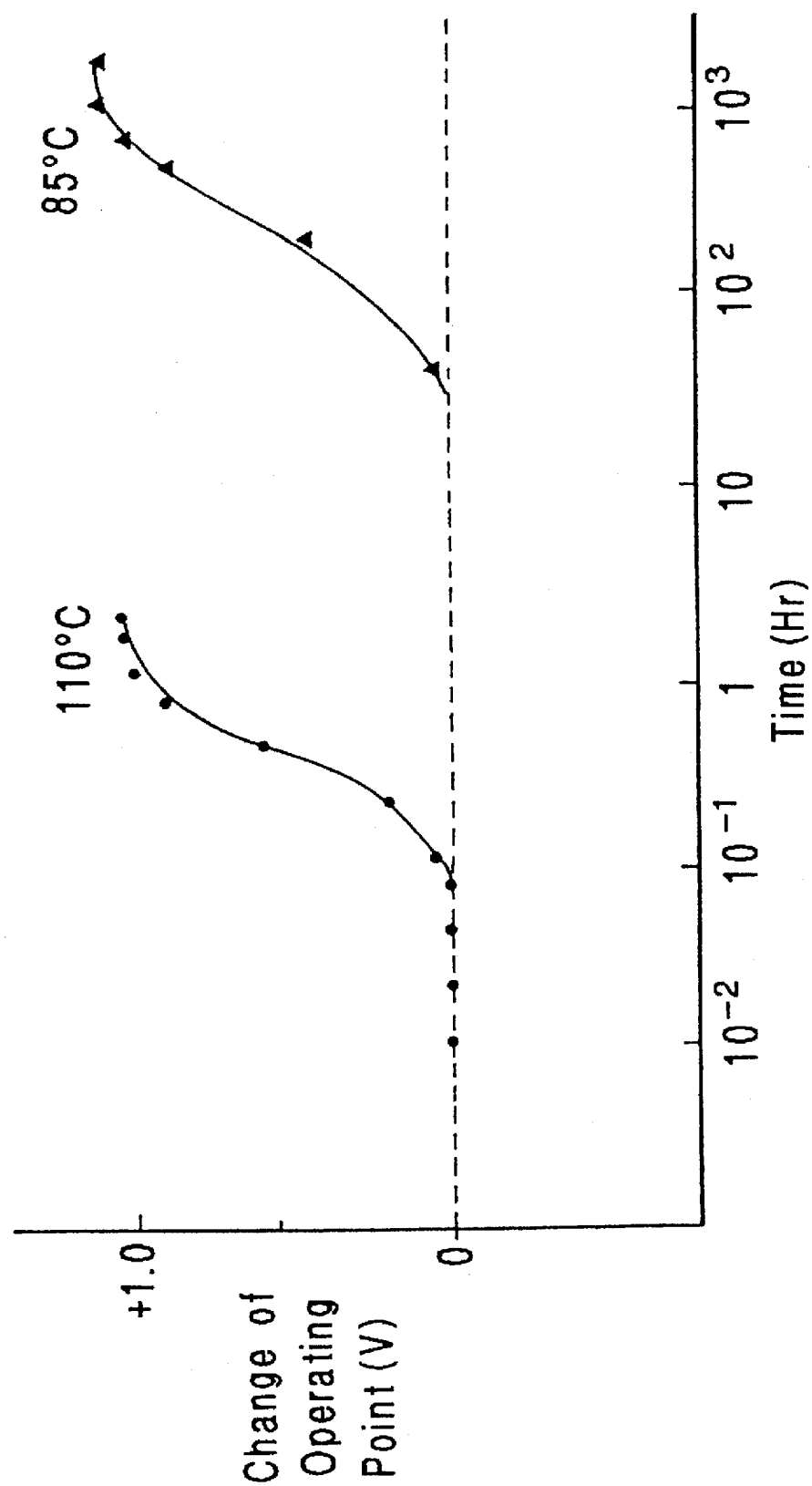
FIG. 6 is a graph showing relationship between change of the operating point and time in the embodiment of the invention.

FIG. 6 is a graph showing change of the operating point with time of a device subjected to annealing. The axis of ordinates represents change of the operating point (V) and the axis of abscissas represents time (Hr). This graph shows relationship between the time period during which Mach-Zehnder type optical modulators fabricated in the same conditions are annealed at 85° C. and 110° C., respectively, and change of the operating point voltage of the optical modulators measured when they were cooled down to normal temperature after having being subjected to the annealing. By application of the annealing, the operating point becomes saturated and it is thereby made possible to obtain a stabilized operating point. This phenomenon is considered attributable to such causes that the internal stress existing in the structure of the gold electrodes generated by plating at temperatures around 80° C. or in the optical waveguides directly under the gold electrodes is relaxed through the annealing and that the gold electrodes obtain coarse structure as a result of evaporation of impurities introduced at the plating and remaining in the interior of the gold electrodes and, thereby, the stress of the gold electrodes exerting on the substrate is lessened. The annealing time can be made shorter by setting the annealing temperature to 100° C. or over.

By experiments, it has been made known that electric resistance of the grounding electrode and the signal electrode changes according as the operating point changes through the process of annealing. More specifically, when annealing is performed while electric resistance between both terminals of the signal electrode, for example, is being measured, the measured value of electric resistance changes in the same manner as the operating point changes as shown in FIG. 6. Accordingly, in performing annealing of the device while electric resistance of at least a portion of either the signal electrode or the grounding electrode is being measured, if the measured value of the electric resistance has become saturated, then it can be confirmed that the operating characteristic of the device has become stabilized.

Discovery of the above phenomenon is very significant, because, in order to actually measure the change of the operating point, it is necessary to couple light with the optical waveguide by, generally, connecting optical fibers to the ends of the optical waveguide, but, then, annealing at high temperatures cannot be performed restricted by the usable temperature limit of the optical fiber. Namely, by making measurement of electric resistance of the electrode as substitute for the measurement of the change of the operating point, the restriction on the annealing temperature can be removed.

The operating point becoming stabilized can also be known by the following method. That is, close to an optical waveguide on a substrate, a dummy optical modulator, which is formed of a dummy optical waveguide and at least two symmetrical dummy electrodes applying an electric field to the dummy optical waveguide, is placed on the substrate and annealing is stopped when it is noticed that the operating point of the Mach-Zehnder type optical modulator whose characteristic is to be stabilized has become equal to the operating point of the dummy optical modulator. The dummy optical modulator is designed to have optical characteristics equivalent to those of the Mach-Zehnder type optical modulator. The design can be easily made because it is possible to form a quite analogous optical waveguide on the substrate by planar techniques.

While the above embodiment has been for a Mach-Zehnder type optical modulator, the present invention can be applied also to balance bridge type optical switches and other optical waveguide devices. Although the material of the substrate has been described to be lithium niobate, the invention can also be applied to optical waveguide devices using lithium tantalate (LiTaO$_3$) or other ferroelectric crystal for the substrate.

The present invention is not limited to the details of the above described preferred embodiments. The scope of the invention is defined by the appended claims and all changes and modifications as fall within the equivalence or the scope of the claims are therefore to be embraced by the invention.

What is claimed is:

1. A method of fabricating an optical waveguide device having at least two asymmetric electrodes for applying an electric field to an optical waveguide formed on a substrate of a ferroelectric crystal comprising the steps of:

(a) forming said electrodes on said substrate; and
    (b) performing annealing for said substrate and said electrodes at a high temperature thereby stabilizing the operating characteristic of said optical waveguide device.

2. A method of fabricating an optical waveguide device according to claim 1, further comprising the step of cutting out said optical waveguide device from a wafer, wherein said step (b) is performed after said step (a) has been performed.

3. A method of fabricating an optical waveguide device according to claim 1, wherein said step (b) includes the step of measuring electric resistance of at least a portion of said electrode and confirming that the operating characteristic has been stabilized by noticing the fact that the measured value has become saturated.

4. A method of fabricating an optical waveguide device according to claim 1, wherein said optical waveguide device is a Mach-Zehnder type optical modulator.

5. A method of fabricating an optical waveguide device according to claim 1, wherein said annealing is performed at a temperature of 100° C. or over.

6. A method of fabricating an optical waveguide device according to claim 1, wherein said ferroelectric crystal is of lithium niobate.

7. A method of fabricating an optical waveguide device according to claim 1, wherein said ferroelectric crystal is of lithium tantalate.

8. A method of fabricating an optical device according to claim 1, wherein further:

in step (a) the electrodes are formed by plating.

* * * * *